US009314102B2

(12) United States Patent
Brownsberger et al.

(10) Patent No.: US 9,314,102 B2
(45) Date of Patent: Apr. 19, 2016

(54) VERTICAL SEAT MOTION LOCK

(71) Applicant: AMI Industries, Inc., Colorado Springs, CO (US)

(72) Inventors: Timothy Brownsberger, Colorado Springs, CO (US); Donald Pinkal, Colorado Springs, CO (US)

(73) Assignee: AMI INDUSTRIES, INC., Colorado Springs, CO (US)

(*) Notice: Subject to any disclaimer, the term of this patent is extended or adjusted under 35 U.S.C. 154(b) by 65 days.

(21) Appl. No.: 14/174,239

(22) Filed: Feb. 6, 2014

(65) Prior Publication Data

US 2014/0327283 A1 Nov. 6, 2014

Related U.S. Application Data

(60) Provisional application No. 61/818,143, filed on May 1, 2013.

(51) Int. Cl.
*A47C 3/20* (2006.01)
*B60N 2/16* (2006.01)
*B64D 11/06* (2006.01)

(52) U.S. Cl.
CPC ............... *A47C 3/20* (2013.01); *B60N 2/1685* (2013.01); *B64D 11/0689* (2013.01)

(58) Field of Classification Search
CPC ............................ A47C 3/20; B60N 2/1685
USPC ............................................ 297/344.12, 338
See application file for complete search history.

(56) References Cited

U.S. PATENT DOCUMENTS

| 1,242,024 | A | * | 10/1917 | Nichols | 248/125.3 |
| 4,003,534 | A | | 1/1977 | Kenigsberg et al. | |
| 4,525,010 | A | | 6/1985 | Trickey et al. | |
| 4,625,934 | A | | 12/1986 | Ryan et al. | |
| 4,845,620 | A | | 7/1989 | Parker | |
| 4,856,747 | A | * | 8/1989 | Gano | 248/354.7 |
| 5,180,131 | A | * | 1/1993 | Few | 248/352 |
| 5,485,044 | A | | 1/1996 | Mackay et al. | |
| 5,676,336 | A | | 10/1997 | Nefy et al. | |
| 6,685,269 | B1 | | 2/2004 | Freijy et al. | |
| 7,290,742 | B2 | * | 11/2007 | Wang | 248/200.1 |
| 7,758,095 | B2 | * | 7/2010 | Elhanany | 296/63 |
| 8,087,729 | B2 | | 1/2012 | Kladde | |
| 8,376,466 | B2 | | 2/2013 | Kladde | |
| 2004/0251367 | A1 | * | 12/2004 | Suzuki | B60R 21/0132 242/390.8 |
| 2005/0275267 | A1 | * | 12/2005 | Schumann et al. | 297/344.12 |
| 2007/0273193 | A1 | * | 11/2007 | Ichikawa et al. | 297/344.12 |
| 2009/0127907 | A1 | * | 5/2009 | Hoshi et al. | 297/344.12 |
| 2011/0291454 | A1 | * | 12/2011 | Greenwood | 297/344.12 |
| 2013/0207429 | A1 | * | 8/2013 | Hoyle | 297/338 |
| 2013/0276678 | A1 | * | 10/2013 | Greenwood et al. | 108/147 |
| 2013/0328364 | A1 | | 12/2013 | Cecinas et al. | |
| 2014/0035338 | A1 | * | 2/2014 | Greenwood et al. | 297/344.12 |

* cited by examiner

Primary Examiner — David R Dunn
Assistant Examiner — Timothy J Brindley
(74) Attorney, Agent, or Firm — Cantor Colburn LLP

(57) ABSTRACT

A vertical seat motion lock apparatus is provided and includes a seat base, a locking system coupled to the seat base and disposable in a locking position, at which the locking system is configured to permit upward seat base movement and to prevent uncommanded downward seat base movement, and an unlocked position and a control system coupled to the locking system, the control system being biased to cause the locking system to assume the locking position and configured to be selectively actuated to cause the locking system to assume the unlocked position.

12 Claims, 3 Drawing Sheets

VERTICAL SEAT MOTION LOCK

CROSS-REFERENCE TO RELATED APPLICATION

This application is a non-provisional application that claims the benefit of priority to provisional application No. 61/818,143, which was filed on May 1, 2013. The entire contents of provisional application No. 61/818,143 are incorporated herein by reference.

BACKGROUND OF THE INVENTION

The subject matter disclosed herein relates to a vertical seat motion lock and, more particularly, to a vertical seat motion lock for use with aircraft pilot seats.

In an aircraft, aircraft pilot seats must be vertically adjustable to provide comfort, proper vision and access to flight controls. When this adjustment is accomplished with an electromechanical actuator, a system that is configured to lock the seat at the desired height must be incorporated into the design. A redundant vertical locking mechanism may also be required, depending on customer requirements, in case the system fails in some manner so that the aircraft pilot seat does not suddenly move downwardly such that the pilot is uncomfortable, lacks proper vision or loses access to flight controls.

BRIEF DESCRIPTION OF THE INVENTION

According to one aspect of the invention, a vertical seat motion lock apparatus is provided and includes a seat base, a locking system coupled to the seat base and disposable in a locking position, at which the locking system is configured to permit upward seat base movement and to prevent uncommanded downward seat base movement, and an unlocked position and a control system coupled to the locking system, the control system being biased to cause the locking system to assume the locking position and configured to be selectively actuated to cause the locking system to assume the unlocked position.

According to another aspect of the invention, a vertical seat motion lock apparatus is provided and includes a seat base on which a seat is disposable, the seat base being selectively movable in a vertical direction, a locking system coupled to the seat base and disposable in a locking position, at which the locking system is configured to permit upward seat base movement and to prevent uncommanded downward seat base movement, and an unlocked position and a control system coupled to the locking system, the control system being biased to cause the locking system to assume the locking position and configured to be selectively actuated in a first direction to cause the locking system to assume the unlocked position and in a second direction to selectively move the seat base upwardly.

According to yet another aspect of the invention, a seat base positioning method is provided and includes selectively moving a seat base in a vertical direction, disposing a locking system coupled to the seat base in a locking position, at which the locking system is configured to permit upward seat base movement and to prevent uncommanded downward seat base movement, and an unlocked position, biasing a control system to cause the locking system to assume the locking position and selectively actuating the control system to cause the locking system to assume the unlocked position.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

As described below, a redundant vertical seat motion lock is provided. The redundant vertical seat motion lock includes a wheel, a locking lever and a linkage. The wheel has teeth cut into the outside diameter thereof and is mounted on an actuator drive shaft that rotates to vertically adjust the seat. The locking lever engages the teeth on the wheel and is actuated by the linkage. The teeth on the locking wheel are cut at an angle that allows the locking lever to engage the teeth when the actuator shaft rotates in a first direction (i.e., clockwise) to prevent uncommanded downward seat movement. When the actuator drive shaft rotates in a second direction (i.e., counter clockwise) the angle of the teeth prevent the locking lever from engaging and, thus, upward seat movement is permitted.

The locking lever can also be disengaged by the linkage, which is actuated by an occupant of the seat. This actuation is done by the seat occupant actuating a lever for downward seat movement. This same linkage also turns on an electrical switch that powers a vertical seat motion actuator. The connecting rods in the linkage have slotted holes so that an "up" input on the lever will result in powered vertical seat motion in the upward direction without causing interference with the redundant system. Slotted holes are also incorporated to allow for use of a backup manual release of the actuator. A damping feature is also included in the linkage to ensure the actuator has time to come to a complete stop before the redundant locking system engages.

Figure 1:
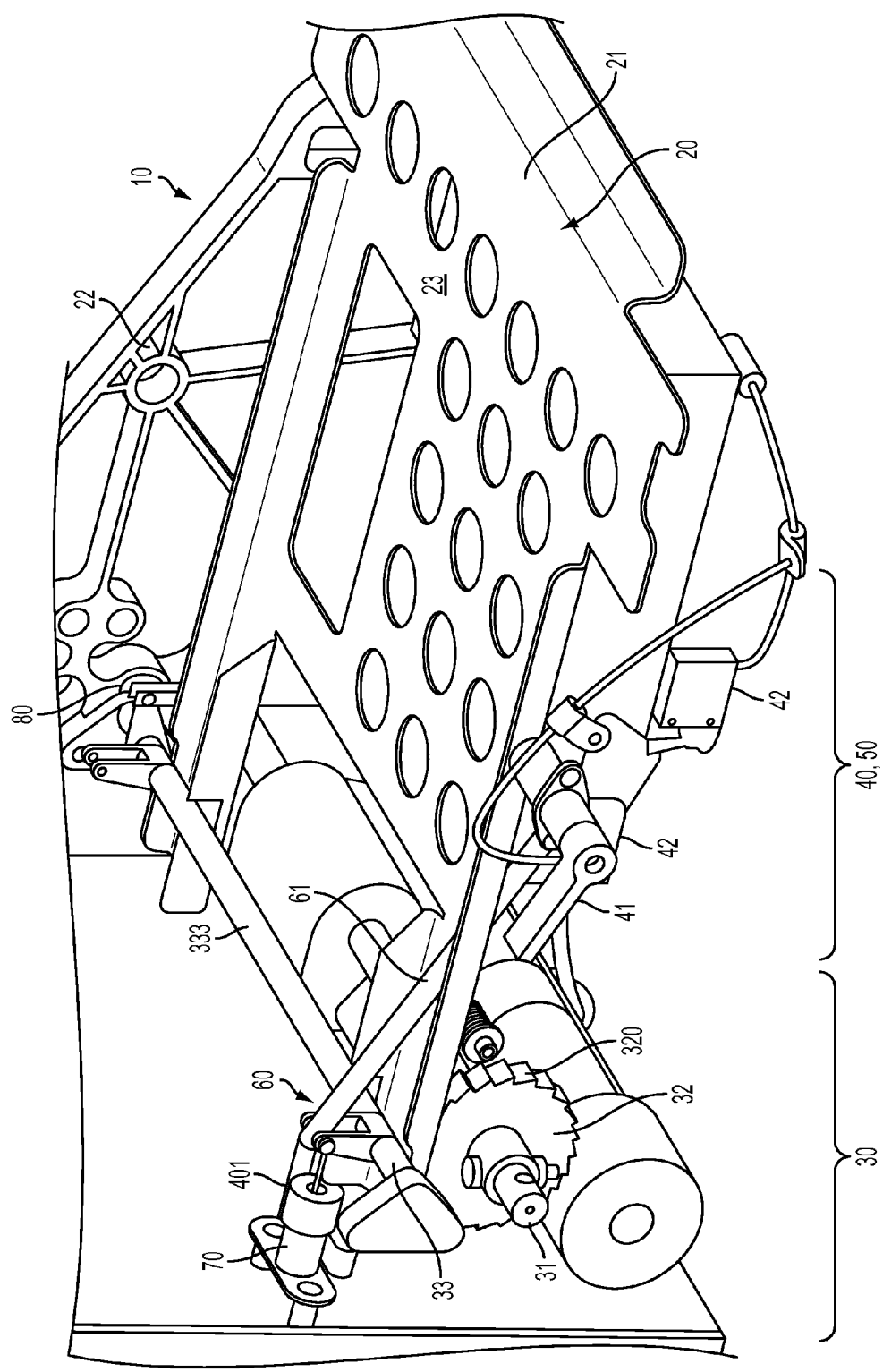
FIG. 1 is a perspective view of a redundant vertical seat motion lock apparatus.
Figure 2:
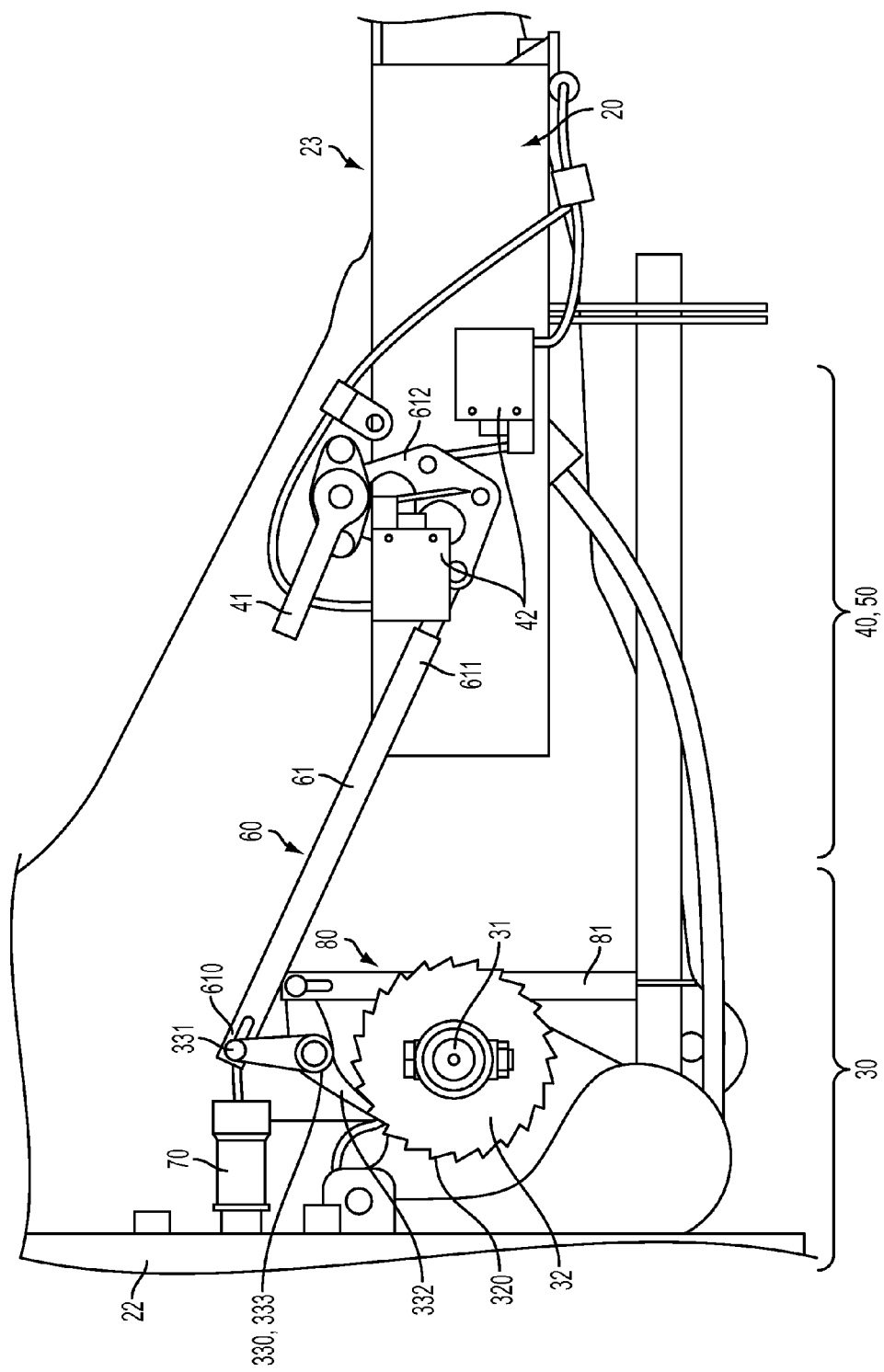
FIG. 2 is a side view of the redundant vertical seat motion lock apparatus of FIG. 1.

With reference to FIGS. 1 and 2, a vertical seat motion lock apparatus 10 (the "apparatus 10") is provided for use with, for example, an aircraft's pilot seat that needs to be vertically adjustable to allow the pilot to have good vision, comfort and access to controls. Especially in cases where the seat positioning system is electronic and is subject to various failure modes (i.e., mechanical breakdowns or power losses), the apparatus 10 serves to prevent uncommanded downward seat movement and can provide for upward seat movement, if necessary.

As shown in FIGS. 1 and 2, the apparatus 10 includes a seat base 20 on which a seat or cushion is disposable, a locking system 30, a control system 40 and an electronic seat base positioning system 50 that is configured to selectively position the seat base 20 and may be a component of the control system 40 or a separate component. The seat base 20 is selectively movable in a vertical direction either upwardly or downwardly such that the seat or cushion disposed on the seat base 20 is similarly movable. The seat base 20 may be provided as a rigid or semi-rigid structure 21 with framing sidewalls 22 and a substantially flat or planar surface 23 on which the seat or cushion may be laid. The surface 23 can be formed to define vent or air holes to lighten the seat base 20 and to encourage cooling air flow into the seat or cushion.

The locking system 30 is operably coupled to the seat base 20 and is disposable in a locking position (see FIG. 2) or an unlocked position. In the locking position, the locking system 30 is configured to permit upward movement of the seat base 20 and to prevent uncommanded downward movement of the seat base 20. In the unlocked position, the locking system 30 is configured to permit upward and downward movement of the seat base 20. The locking system 30 includes a driveshaft 31, a locking wheel 32 and a locking lever 33. The driveshaft 31 is coupled to the seat base 20 and rotates about a longitudinal axis thereof with upward and downward movement of the seat base 20. Thus, when the seat base 20 moves downwardly, the driveshaft 31 rotates in a first direction (i.e., clockwise in FIGS. 1 and 2) and, when the seat base 20 moves upwardly, the driveshaft 31 rotates in a second direction (i.e., counter clockwise in FIGS. 1 and 2).

The locking wheel 32 is disposed on the driveshaft 31 to rotate with the driveshaft 31 and includes an array of teeth 320 on an outer diameter thereof. The teeth 320 are each angled such that a short forwardly angled edge leads a longer rearwardly angled edge during rotation of the driveshaft 31 and the locking wheel 32 in the first direction. The locking lever 33 has a body 330, a first end 331 and a second end 332. The body 330 is coupled to a linkage shaft 333 such that both the body 330 and the linkage shaft 333 are pivotable or rotatable about a longitudinal axis of the linkage shaft 333. The second end 332 has a surface that is configured to fit between the teeth 320 and to abut the short forwardly angled edge of the corresponding trailing tooth to thereby prevent rotation of the driveshaft 31 and the locking wheel 32 in the first direction when the locking system 30 is disposed in the locking position. Conversely, when the locking system 30 is disposed in the unlocking position, the body 330 is pivoted about the longitudinal axis of the linkage shaft 333 such that the second end 332 is removed from the locking wheel 32 and the teeth 320.

The first end 331 of the body 330 of the locking lever 33 is rotatably coupled to a linkage assembly 60, which connects the locking lever 33 with the control system 40. The linkage assembly 60 includes a linkage assembly arm 61 that includes a first end 610 to which the first end 331 of the body 330 of the locking lever 33 is rotatably coupled and a second end 611 that is connected to a rotating cam 612 of the control system 40. The control system 40 is thereby coupled to the locking system 30 and biased to cause the locking system 30 to assume the locking position. That is, under normal circumstances, the locking system 30 will be disposed in the locking position such that uncommanded downward movement of the seat base 20 will be prevented. The bias may be provided by an elastic or pneumatic element 401 (see FIG. 1) provided with the locking system 30 or the control system 40.

The control system 40 is further configured to be selectively actuated in a first direction or a second direction. Actuation of the control system 40 in the first direction causes the locking system 40 to assume the unlocked position whereas actuation of the control system 40 in the second direction can, in some cases, selectively move the seat base 20 upwardly. Thus, the control system 40 can operate as the electronic seat base positioning system 50 for at least upward seat base 20 movements or the control system 40 can be configured with the electronic seat base positioning system 50 as a component thereof for at least upward seat base 20 movements. In accordance with alternative embodiments, the control system 40 may override or stand in the place of the electronic seat base positioning system 50 for at least upward seat base 20 movements. For purposes of clarity and brevity, the alternative embodiments noted herein will be described as an exemplary case but it is to be understood that the description is not intended to otherwise limit the scope of the application in any way.

The control system 40 includes a lever 41 and switching elements 42. The lever 41 is normally provided at a neutral position that is associated with the locking system 30 being disposed in the locking position but with no upward or downward seat base 20 movement commands being entered. The lever 41 is disposed on a side of the seat base 20 and is manually accessible to a seat occupant. In this position, the lever 41 may be selectively actuated by, for example, a pivoting motion such that a pivot of the lever 41 in a first direction (i.e., counter clockwise in FIGS. 1 and 2) causes the locking system 30 to assume the unlocked position and a pivot of the lever 41 in a second direction (i.e., clockwise in FIGS. 1 and 2) permits an upward seat base 20 movement command to be entered. The switches 42 are operably coupled to the lever 41 and regulate the transmission of at least upward seat base 20 movement commands when the lever 41 is pivoted in the second direction.

When the lever 41 is pivoted in the first direction, the rotating cam 612 rotates accordingly as a result of a mechanical linkage between the lever 41 and the rotating cam 612 or by actuation of either or both of the switches 42. In either case, the rotation of the rotating cam 612 causes the linkage assembly arm 61 to translate toward the lever 41, which, in turn, causes the body 330 of the locking lever 33 to pivot about the longitudinal axis of the linkage shaft 333 such that the second end 332 is removed from the locking wheel 32 and the teeth 320. Thus, when the lever 41 is pivoted in the first direction, the locking system 30 is caused to assume the unlocked position.

With the locking system 30 disposed in the unlocked position, the second end 332 of the locking lever 33 is removed from the locking wheel 32 and the teeth 320 such that rotation of the locking wheel 32 and the driveshaft 31 is permitted along with corresponding downward movement of the seat base 20. Moreover, continued pivoting of the lever 41 in the first direction may be defined as an instruction to move the seat base 20 downwardly as well such that the seat occupant can manipulate only the lever 41 to vertically adjust his seating position.

When the lever 41 is pivoted in the second direction, a similar operation of the control system 40 and the locking system 30 is unnecessary due to the fact that even when the locking system 30 is disposed in the locking position, upward movement of the seat base 20 is permitted. As noted above, such upward movement may be commanded by continued pivoting of the lever 41 in the second direction.

In addition to the features described above, the apparatus 10 may include a damper 70 and a manual release system 80. The damper 70 is anchored on a proximal one of the framing sidewalls 22 and is coupled to the linkage assembly 60. In this position, the damper 70 is configured to delay a re-disposition of the locking system 30 in the locking position following a selective actuation of the control system 40 to cause the locking system 30 to assume the unlocked position. That is, once the locking system 30 assumes the unlocking position and the lever 41 is released, the damper 70 delays the re-engagement of the second end 332 of the locking lever 33 with the teeth 320 of the locking wheel 32. The delay softens an effect of the re-engagement and prevents damage to the various components described herein. The manual release system 80 includes a manual release lever 81 that is pivotably or rotatably coupled to the linkage shaft 333. The manual release lever 81 is disposed on a side of the seat base 20 opposite from the lever 41 and is configured to be selectively actuated to cause the locking system 30 to assume the unlocked position by a similar operation as described above. That is, the actuation of the manual release lever 81 causes the linkage shaft 333 and the body 330 of the locking lever 33 to pivot about the longitudinal axis of the linkage shaft 333 such that the second end 332 of the locking lever 33 is removed from the teeth 320 of the locking wheel 32.

Figure 3:
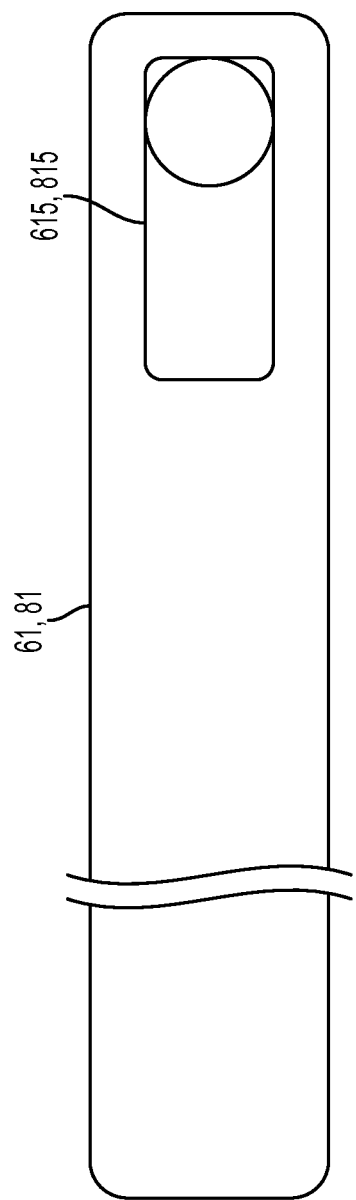
FIG. 3 is an enlarged schematic view of a slotted hole for components of the vertical seat motion lock apparatus.

With reference to FIG. 3, the linkage assembly arm 61 and the manual release lever 81 may be rotatably coupled to the first end 331 of the body 330 of the locking lever 33 and to a flange of the linkage shaft 333, respectively, at slotted holes 615, 815. The slotted holes 615, 815 improve the timing of the damper 70 and facilitate the operation of the manual release system 80.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A vertical seat motion lock apparatus, comprising:
   a seat base;
   a locking system coupled to the seat base and disposable in a locking position, at which the locking system is configured to permit upward seat base movement and to prevent uncommanded downward seat base movement, and an unlocked position; and
   a control system coupled to an electronic seat base positioning system configured to selectively position the seat base and to the locking system, the control system being biased to cause the locking system to assume the locking position and configured to be selectively actuated to cause the locking system to assume the unlocked position.

2. The vertical seat motion lock apparatus according to claim 1, wherein the locking system comprises:
   a driveshaft, which rotates with seat base movement;
   a locking wheel disposed on the driveshaft to rotate with the driveshaft, the locking wheel including a teeth on an outer diameter thereof; and
   a locking lever configured to engage with the teeth of the locking wheel to prevent rotation of the locking wheel and the driveshaft in a first direction and to permit rotation of the locking wheel and the driveshaft in a second direction.

3. The vertical seat motion lock apparatus according to claim 1, wherein the control system comprises a lever that is selectively actuated to cause the locking system to assume the unlocked position.

4. The vertical seat motion lock apparatus according to claim 1, wherein the control system comprises a damper configured to delay a repositioning of the locking system while in the unlocked position.

5. The vertical seat motion lock apparatus according to claim 1, wherein the control system comprises a manual release system configured to be selectively actuated to cause the locking system to assume the unlocked position.

6. A vertical seat motion lock apparatus, comprising:
   a seat base on which a seat is disposable, the seat base being selectively movable in a vertical direction;
   a locking system coupled to the seat base and disposable in a locking position, at which the locking system is configured to permit upward seat base movement and to prevent uncommanded downward seat base movement, and an unlocked position; and
   a control system coupled to an electronic seat base positioning system configured to selectively position the seat base and to the locking system, the control system being biased to cause the locking system to assume the locking position and configured to be selectively actuated in a first direction to cause the locking system to assume the unlocked position and in a second direction to selectively move the seat base upwardly.

7. The vertical seat motion lock apparatus according to claim 6, further comprising an electronic seat base positioning system configured to selectively position the seat base.

8. The vertical seat motion lock apparatus according to claim 6, wherein the locking system comprises:
   a driveshaft, which rotates with seat base movement;
   a locking wheel disposed on the driveshaft to rotate with the driveshaft, the locking wheel including a teeth on an outer diameter thereof; and
   a locking lever configured to engage with the teeth of the locking wheel to prevent rotation of the locking wheel and the driveshaft in a first direction and to permit rotation of the locking wheel and the driveshaft in a second direction.

9. The vertical seat motion lock apparatus according to claim 8, further comprising a linkage connecting the locking lever with the control system.

10. The vertical seat motion lock apparatus according to claim 6, wherein the control system comprises a lever that is selectively actuated to cause the locking system to assume the unlocked position.

11. The vertical seat motion lock apparatus according to claim 6, wherein the control system comprises a damper configured to delay a repositioning of the locking system while in the unlocked position.

12. The vertical seat motion lock apparatus according to claim 6, wherein the control system comprises a manual release system configured to be selectively actuated to cause the locking system to assume the unlocked position.

* * * * *